United States Patent [19]
Fleischer et al.

[11] 3,713,921
[45] Jan. 30, 1973

[54] GEOMETRY CONTROL OF ETCHED NUCLEAR PARTICLE TRACKS
[75] Inventors: Robert L. Fleischer; Paul B. Price, both of Schenectady; Edgar E. Bostick; Fred F. Holub, both of Scotia, all of N.Y.
[73] Assignee: General Electric Company, Schenectady, N.Y.
[22] Filed: April 1, 1971
[21] Appl. No.: 130,514

Related U.S. Application Data

[63] Continuation of Ser. No. 739,034, June 21, 1968, abandoned.

[52] U.S. Cl. .........................156/2, 156/7, 161/109, 55/389, 204/159.14, 204/159.19
[51] Int. Cl. .........................C08f 27/00, C08f 47/12
[58] Field of Search.........156/2, 7; 161/109; 55/389; 204/159.14, 159.19

[56] References Cited

UNITED STATES PATENTS

| 2,968,538 | 1/1961 | Chapman | 156/2 |
| 3,303,085 | 2/1967 | Price et al. | 161/109 |
| 3,515,649 | 6/1970 | Hepfer | 204/38 |

*Primary Examiner*—Jacob H. Steinberg
*Attorney*—Oscar B. Waddell, Melvin M. Goldenberg, Paul A. Frank, John F. Ahern, Jane M. Binkowski and Frank L. Neuhauser

[57] ABSTRACT

A process for making holes of reduced taper in a solid containing tracks of radiation damaged material by contacting the solid with an etchant containing a surfactant. The product is useful as a filter.

8 Claims, 4 Drawing Figures

PATENTED JAN 30 1973　　　　　　　　　　3,713,921

Inventors:
Robert L. Fleischer,
Paul B. Price,
Edgar E. Bostick,
Fred F. Holub,
by Jane M. Binkowski
Their Attorney.

GEOMETRY CONTROL OF ETCHED NUCLEAR PARTICLE TRACKS

This application is a continuation of application Ser. No. 739,034 filed June 21, 1968, now abandoned.

Porous bodies or filters having straight-through holes of extremely small diameter and a method of making such porous bodies have been described and claimed in U.S. Pat. No. 3,303,085 — Price et al, Jan. 7, 1967. The method of the aforementioned patent involves a combination of irradiation damage along substantially straight paths and the chemical removal of the damaged material to provide pores or holes. More specifically, a solid is bombarded with heavy energetic particles to produce tracks of radiation damaged material which are removed by etching as by immersing the irradiated solid in an etchant.

While holes formed in this manner are reasonably uniform in diameter throughout their length, there is a tendency in a number of materials for a minimum diameter region to be formed between the mouths of the corresponding holes through opposite surfaces so that the resultant penetrating holes have a tapered, longitudinal cross section somewhat like an hourglass. In addition, if the tracks of damaged material end within the solid rather than passing completely through it, the damaged material is etched and the etching prolonged until the remaining undamaged material is penetrated to form a hole. The result is a tapered hole. The taper of the etched tracks is dictated by the relative rates of attack of a chemical reagent along the damaged track and that on the surrounding undamaged material. For such uses as in filters it is usually desirable to have holes with as little taper as possible.

By the method of the present invention, the irradiated solid is etched to reduce the degree of taper and thereby facilitate the etching of fine holes. Specifically, the solid which has previously been subjected to radiation to produce the tracks of damaged material is etched with an etchant containing a surfactant. The effect of the surfactant is to selectively increase the etching rate along the damaged tracks in the solid without increasing the attack rate of the undamaged material. The result is that the cone angle of the etched tracks is significantly reduced, forming holes in a shorter period of time which are finer than those produced by the use of etchant alone.

The process of the present invention also eliminates a problem of clogging which occurs during the etching of some irradiated solids, particularly when such etching is interrupted by removal, rinsing and drying of the sample. The reason for such clogging is not clear, but when it occurs, it slows or stops the etching until the etchant etches around such impenetrable spot, thus altering the track geometry to form a non-uniform taper. Specifically, it has been determined that an irradiated solid which clogs frequently during the process of etching, when etchant alone is used, does not clog when that etchant contains surfactant.

The present invention, together with further objects and advantages thereof, will be better understood from the following description taken in connection with the accompanying drawings, and its scope will be pointed out in the appended claims.

Figure 1:
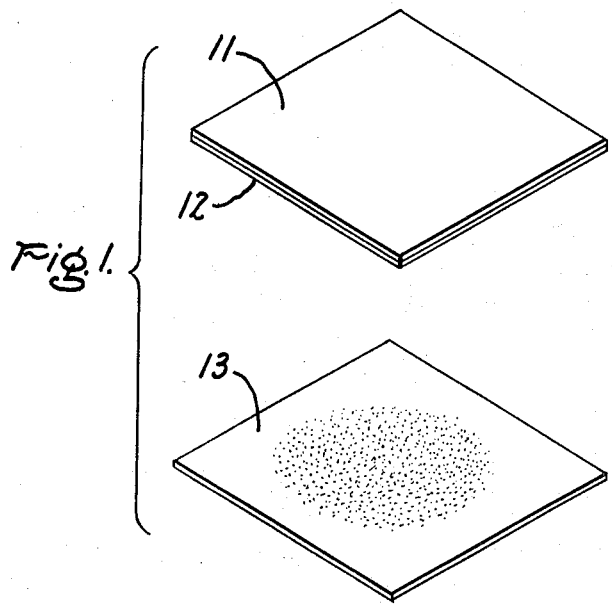
FIG. 1 is a composite view in perspective illustrating one method of bombarding, i.e. irradiating, a solid in sheet form with charged particles.
Figure 2:
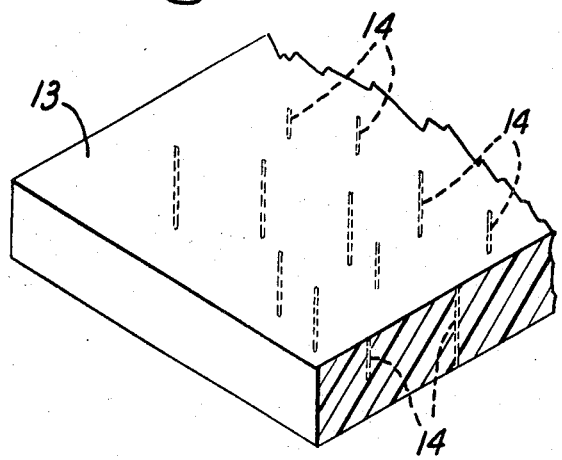
FIG. 2 is an enlarged fragmentary view of the irradiated sheet of FIG. 1.

One method of irradiating the solid for use in the present process is shown in FIG. 1. A layer 12 of Californium-252 on substrate 11 emits fission fragments, i.e. heavy charged particles, which form tracks 14 of radiation damaged material in sheet 13.

Representative of the solids useful in the present invention are natural and synthetic glasses as well as thermosetting and thermoplastic polymers and copolymers. Illustrative of suitable polymers are the polycarbonates disclosed in U.S. Pat. No. 2,946,766. Commercially, these polycarbonates are usually polyesters of bis($\alpha$-hydroxyphenyl) alkanes such as 2,2-bis (4-hydroxyphenyl) propane (Bisphenol A). Additional examples of suitable polymers are polyethylene terephthalate, high density polyethylene, polystyrene, and the cellulose esters such as the nitrate, acetate and butyrate. A typical example of a satisfactory copolymer is the organopolysiloxane-polycarbonate block copolymer disclosed in U.S. Pat. No. 3,189,662.

The solid used in the instant process can have any desired shape. For most applications, it is used in the form of a sheet. A solid which is thermoplastic should be formed into the desired shape by any conventional technique prior to bombardment. The specific thickness of the sheet depends somewhat on its final use. It need only be thick enough to form a continuous film, generally at least a few hundred Angstroms thick. Its maximum thickness is limited by the range of the bombarding charged particles, and the etchability of the solid itself as well as its track defining damaged portions. For a number of solids, the maximum thickness is about 20 microns or higher if fission fragments are used for track formation.

Any bombarding procedure which will produce the desired tracks in the solid sheet can be used. The process can be carried out in air or in a vacuum. Ions and particles which are generated in beams such as argon and oxygen ions are preferred since they produce substantially aligned tracks in the solid sheet in air or in a vacuum. On the other hand, particles such as Uranium-235, or Californium-252 fission fragments, or alpha particles can produce either substantially aligned tracks or random tracks. Improved alignment can be obtained in air with fission fragments by disposing a collimator between the fission fragments and the sheet to allow passage of substantially parallel fragments only.

The particular type of charged particles used to bombard the solid sheet depends largely on the extent to which they form tracks of damaged material in the solid since some solids are more easily damaged than others.

Fission fragments, and ions heavier than alpha particles, such as oxygen ions, form tracks of damaged material in most polymers. Oxygen ions are more effective with polymers such as the polycarbonates, whereas alpha particles are more suitable with the more easily damageable polymers such as the cellulose esters.

The etching process to extract the tracks of damaged material can be carried out in a conventional manner. For example, the track-containing solid can be immersed in a solution of the etchant containing the surfactant until the damaged portions are substantially extracted. The etched solid should then be rinsed with water to remove the etchant.

The etchant used to extract the tracks of damaged material must not significantly affect the remainder of the solid. Generally, the etchant is a liquid. The particular etchant used and its concentration in solution depends on the extractability of the damaged solid. Typical etchants include hydrofluoric acid, sodium hydroxide, potassium hydroxide, and potassium permanganate.

Figure 3:
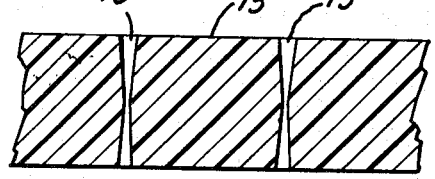
FIG. 3 is a fragmentary enlarged cross-sectional view of a sample of the irradiated sheet after it had been etched by the process of the present invention, i.e. using an etchant containing a surfactant.
Figure 4:
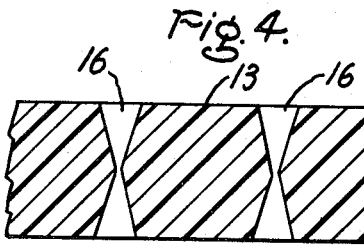
FIG. 4 is a fragmentary enlarged cross-sectional view of a sample of the irradiated sheet after it had been etched with an etchant containing no surfactant showing the tapered configuration of the resulting holes 16 in the sheet.

The surfactant of the present invention is a surface-active agent which causes the etchant to penetrate along the damaged tracks of an irradiated solid at a rate faster than that of the same etchant which does not contain surfactant. Since the tracks are etched more rapidly, the irradiated solid is contacted with etchant for a shorter period of time. The undamaged portion of the solid is, therefore, less affected by the etchant making possible longer etched tracks in a solid of given thickness. This also enables the use of thinner films. Since the resulting holes have less taper throughout their length, as illustrated by the holes 16 shown in FIG. 3, they are less likely to clog when the material is used as a filter. In addition, clogging during the etching process is eliminated. By means of the present invention, careful control of hole size by repeated etches is now practical.

The surfactant of the present invention may be anionic, cationic or nonionic with the selection of a particular surfactant depending largely on the etchant used, i.e. the etchant should not decompose or degrade the surfactant significantly. In addition, the use of a specific surfactant depends on the extent of the increase in attack rate which it produces along the damaged tracks. The amount of surfactant used is not critical and may vary within a wide range depending on the increase in attack rate produced by a specific amount. Generally, satisfactory results are obtained with amounts of surfactant ranging from about 0.01 to about 2 percent by volume of the etchant. Representative of the anionic surfactants are sodium salts of organic sulfonates, especially alkylaryl sulfonates such as the sulfonates of dodecylbenzene, as for example, disodium-4-dodecylated oxydibenzenesulfonate. Other representative anionic surfactants include sodium alkylnaphthalenesulfonate, sodium N-methyl-N-oleyltaurate, sodium oleylisethionate and the sodium salt of sulfated nonyl phenoxypoly (ethyleneoxy) ethanol. Typical cationic surfactants include lauryltrimethylammonium chloride and octadecyltrimethylammonium chloride. Examples of nonionic surfactants are polyethylene glycol lauryl ether and tris (polyoxyethylene) sorbitan monolaurate. Fluorochemical surfactants, which may be nonionic, cationic or anionic, can also be used. A typical fluorochemical surfactant includes a perfluoro-alkyl chain in the surfactant molecule.

The degree of taper, i.e. cone angle, of a hollowed track or hole is determinable from the rate of etching of the track and the rate of increase of the radius of the etched track. The irradiated solid is initially etched for a specific short period of time. The solid is then rinsed with neutralizer or water to stop the etching action and the depth of the hollowed tracks is measured. The partially etched solid is then etched again in the same manner for a second specific period of time significantly longer than the initial etching period. The etched solid is again rinsed with neutralizer or water to stop the etching action and the diameter of the hollowed tracks is measured. The cone angle is given by arcsin ($v_G/v_T$) where $v_T$ is the linear rate of attack along the track, as found from the shorter etch and $v_G$ is the rate of increase of the track radius, as found by the longer etch.

The etched solids of the present invention are useful as filters for separating materials of a very small size, as for example, various sized molecules of proteins, polymers and viruses. They are also useful in water purification.

All parts used herein are by volume unless otherwise noted.

The invention is further illustrated by the following examples.

The etched tracks in the films of the following examples were measured through a high powered microscope which was calibrated by looking at finely ruled scale.

EXAMPLE 1

In this example, two irradiated samples were etched under the same conditions except that the etchant for one of the samples contained a surfactant.

A sheet of Lexan polycarbonate resin, which is a polycarbonate of Bisphenol A, was used. The sheet was about 254 microns in thickness and had been irradiated in a vacuum of 1 torr, with Californium-252 fission fragments for 15 minutes to produce a track density of about $10^5/cm^2$.

The etchant for one sample of the irradiated sheet was comprised of 6.25N sodium hydroxide solution containing 1 percent by volume Benax 2A1 (45 percent active) anionic surfactant which is disodium 4-dodecylated oxydibenzesulfonate. The etchant for the second sample was 6.25N sodium hydroxide solution alone. Each etchant was preheated to 57°C and maintained at this temperature.

Both samples were immersed in etchant at the same time and at the end of 8 minutes, were removed, rinsed with water, dried in air and examined with a high-powered microscope to determine the extent of etching. This procedure was repeated with the samples being reimmersed in etchant for a period of 10 minutes. The results are shown in Table I.

TABLE I

| Etchant | Time Immersed In Etchant | Length of Etched Tracks |
|---|---|---|
| 6.25N NaOH | 8 minutes | 6 microns |
| 6.25N NaOH & Benax 2A1 | 8 minutes | 10 microns |
| 6.25N NaOH | Additional 10 minutes | 6 microns |

| | | |
|---|---|---|
| | (total 18 minutes) | (no change in length because of clogging) |
| 6.25N NaOH & Benax 2A1 | Additional 10 minutes (total 18 minutes) | 17 microns |

As illustrated by Table I, the presence of the surfactant increases the attack rate along the damaged tracks significantly. In addition, it was determined that the cone angle of the hollowed tracks etched with the sodium hydroxide containing surfactant was about 40 percent smaller than that of the tracks etched with sodium hydroxide alone.

Specifically, the full cone angle of the tracks etched with the sodium hydroxide containing surfactant was about 1.2° whereas the full cone angle of the tracks etched with sodium hydroxide alone was about 2°. The diameter of the holes at the surface in both samples was about 0.2 micron.

EXAMPLE 2

A thin film of Makrofol polycarbonate resin, which is a polycarbonate of Bisphenol A, was used. The film was 10 microns in thickness and had been irradiated in the same manner as disclosed in Example 1.

One sample of the irradiated film was immersed in an etchant comprised of 6.25N sodium hydroxide containing 1 percent by volume of Benax 2A1 (45 percent active) surfactant. A second sample of the film was immersed in 6.25N sodium hydroxide alone. Each etchant was preheated to 57°C and maintained at this temperature.

At the end of 15 minutes, the samples were removed, rinsed with water, dried in air, and examined with a high powered microscope. The maximum length of the holes passing into the film sample etched with sodium hydroxide containing Benax 2A1 (45 percent active) surfactant was 15 microns. These were holes extending obliquely into the film. The maximum length of the holes extending into the film sample etched with sodium hydroxide alone was 9 microns, the film being somewhat thinner than initially. The diameter of the holes at the surface in both samples was about 0.2 micron.

The above procedure was repeated with the films being reimmersed in the etchants for an additional 15 minutes. The holes etched with the sodium hydroxide containing surfactant had significantly less taper than those etched with sodium hydroxide alone. Specifically, the full cone angle of the tracks etched with the sodium hydroxide containing surfactant was 0.8° whereas the full cone angle of the tracks etched with sodium hydroxide alone was 1.3°. The product is useful as a filter.

What we claim as new and desire to secure by Letters Patent of the United States is:

1. A process for geometrically controlling the formation of a solidified resin article suitable as a filter for separating materials of very small size such as protein molecules comprising providing a sheet of solid thermosetting or thermoplastic polymer ranging in thickness up to about 20 microns, bombarding a surface of said sheet with fission fragments to produce substantially straight tracks of damaged material in said sheet extending through said sheet from the bombarded surface through the opposite surface, immersing the bombarded sheet in a liquid etchant which contains an aqueous surfactant to dissolve and remove substantially all of the tracks of damaged material to produce holes extending through said sheet, said surfactant being present in an amount ranging from about 0.01 to about 2 percent by volume of the etchant and being a material which selectively increases the attack rate of said etchant on said tracks of damaged material without increasing the attack rate on the undamaged polymer to produce holes having a significantly reduced degree of taper and a significantly longer length for a given thickness of said sheet, and thereafter rinsing the sheet and removing therefrom adherent etchant.

2. A process according to claim 1 wherein said liquid etchant is selected from the group consisting of hydrofluoric acid, sodium hydroxide, potassium hydroxide and potassium permanganate.

3. A method according to claim 2 wherein said polymer is an organic synthetic polymer and said surfactant is a sodium salt of an organic sulfonate.

4. A method according to claim 3 wherein said polymer is a polycarbonate.

5. A method according to claim 4 wherein said surfactant is disodium-4-dodecylated oxydibenzenesulfonate.

6. A method according to claim 5 wherein said liquid etchant is sodium hydroxide.

7. A method according to claim 6 wherein said cone angle of said holes is reduced by about 40 percent by said etchant containing said surfactant.

8. A method according to claim 6 wherein the length of said holes is increased by about 40 percent by said etchant containing said surfactant.

* * * * *

UNITED STATES PATENT OFFICE
CERTIFICATE OF CORRECTION

Patent No. 3,713,921          Dated Jan. 30, 1973

Inventor(s) Robert L. Fleischer, Paul B. Price, Edgar E. Bostick, and Fred F. Holub It is certified that error appears in the above-identified patent and that said Letters Patent are hereby corrected as shown below:

Column 6, line 16, after "in" delete "a" and insert -- an aqueous --; line 17, after "contains" delete "an aqueous" and insert -- a --.

Signed and sealed this 19th day of November 1974.

(SEAL)
Attest:

McCOY M. GIBSON JR.
Attesting Officer

C. MARSHALL DANN
Commissioner of Patents